United States Patent Office 3,477,294
Patented Nov. 11, 1969

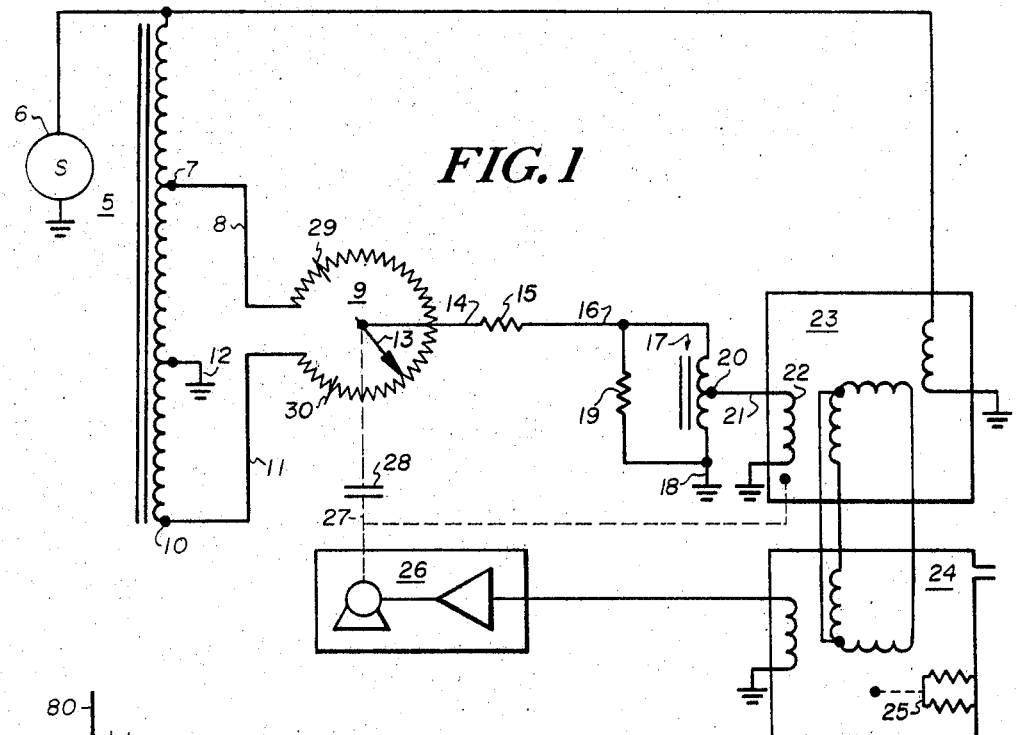
FIG. 1
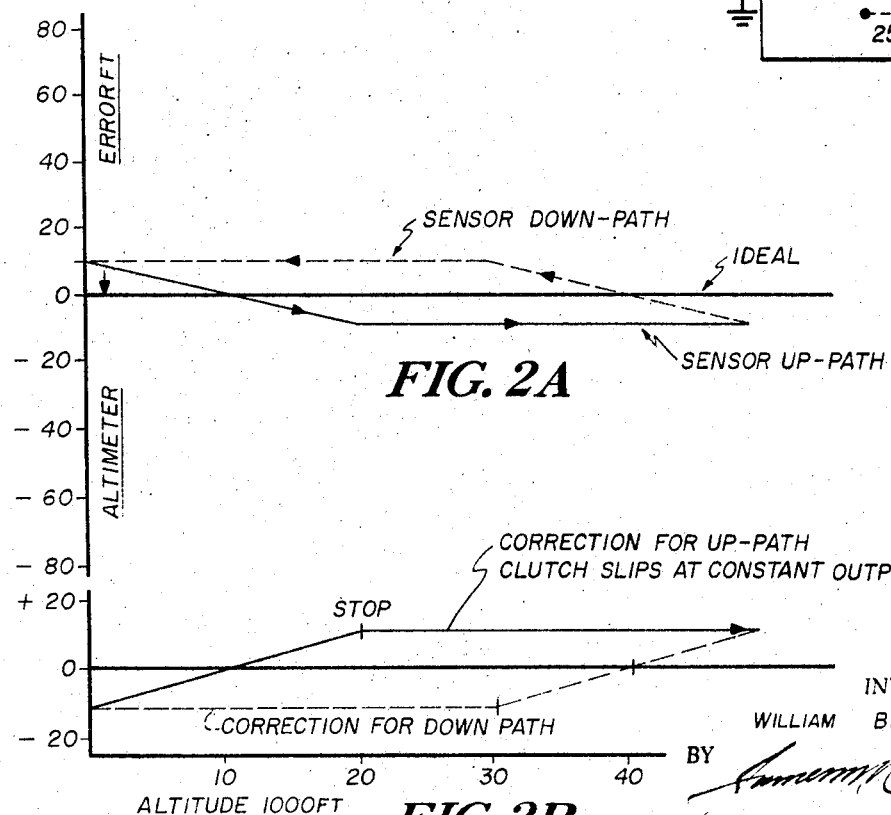
FIG. 2A
FIG. 2B
INVENTOR.
WILLIAM BRANDAU
ATTORNEY

3,477,294
SENSOR HYSTERESIS COMPENSATING SYSTEM
William Brandau, Westwood, N.J., assignor to The
Bendix Corporation, a corporation of Delaware
Filed Feb. 29, 1968, Ser. No. 709,473
Int. Cl. G01l 7/12
U.S. Cl. 73—386          5 Claims

ABSTRACT OF THE DISCLOSURE

A compensating system is disclosed including a potentiometer for providing a means of eliminating the normal discrepancies between the up-scale and down-scale readouts of a diaphragm-type, electromechanical, servo-driven pressure sensor caused by spring hysteresis inherent in the diaphragm capsule assembly.

Background of the invention

*Field of the invention.*—The invention relates to the field of servo-driven mechanical or electromechanical mechanisms which are designed to measure a variable parameter such as pressure, temperature, speed and the like.

*Description of the prior art.*—Heretofore the accuracy emphasis of early altimeter systems was centered in that part of the altitude range associated with limited visibility landings which, being at one extreme end of the sensor range, was not troubled with hysteresis problems. Recent developments in air traffic control now require extreme accuracy be available also in the middle altitude range. Unfortunately this range is also the range of maximum diaphragm hysteresis which acts to limit the inherent system repeatability. To eliminate this problem, a slipping clutch compensating device is provided to program a voltage into the altimeter servo feedback path in such a manner that diaphragm lag is erased.

Summary of the invention

The present invention provides a potentiometer drive mechanism geared in such a manner that full slider travel is achieved for only a small proportion of the sensor servo range. Upon striking wiper travel limiting stops, a clutch in the drive mechanism slips and the potentiometer output voltage is thereafter constant until the direcion of roation is reversed.

Brief description of the drawings

FIGURE 1 is a simplified schematic of a system embodying the invention.

FIGURES 2 and 2B are curves illustrating the invention.

Description of the preferred embodiment

Referring now to FIGURE 1 of the drawing, an autotransformer is indicated generally by the numeral 5 and has its input connected to a suitable source of a.c. voltage 6. The transformer 5 has an intermediate tap 7 connected by conductor 8 to one side of a potentiometer 9 and an end tap 10 connected by conductor 11 to the other side of the potentiometer 9. The center point between the taps 7 and 10 is connected to ground by conductor 12.

The potentiometer 9 has a movable contact 13 which is connected by conductor 14, resistor 15 and conductor 16 to one side of impedance matching transformer 17. The other side of the transformer 17 is connected to ground by conductor 18. A loading resistor 19 is connected across the transformer 17. The transformer 17 has a tap 20 which is connected by conductor 21 to compensating winding 23 of follow-up resolver 24.

Driven resolver 24 is responsive to a sensor 25 which for the purpose of illustration may be an altimeter. The error voltage from the resolver 24 is fed into a computer 26 where it is amplified and caused to drive a servo motor in such a direction that the resultant rotation of resolver 23 reduces that error to a null level. The movable contact 13 of the potentiometer 9 is connected by shaft 27, indicated by dashed line, and slipping clutch 28 for actuation by the computer 26. The potentiometer has stops 29 and 30 positioned at predetermined locations, for example ±160°. Thus movable contact 13 will be carried along with the servo until its shaft strikes either one or the other of the stops 29 and 30. From that time on the clutch 28 will slip thus providing a constant output until the mechanism again reverses direction.

Referring now to FIGURE 2 of the drawing, the curve 2A illustrates the typical action of a sensor without correction as compared to an ideal path. It is noted that correction is needed in one direction on the up path and in another direction on the down path. Curve 2B illustrates the correction provided by the present invention.

In up-scale operation, the clutch driven potentiometer causes the sensor to produce a gradually increasing lead over its normal position until it reaches a stop. Thereafter the lead magnitude is constant. When down-scale motion is initiated, the movable slider pulls out of its stop to first remove the correction and then to reverse it until the opposite stop is reached and the clutch will slip at a constant output, again producing the necessary lead over its normal position.

Although only one embodiment of the invention has been illustrated and described, various changes in the form and relative arrangement of the parts, which will now appear to those skilled in the art, may be made without departing from the scope of the invention.

What is claimed is:

1. A hysteresis compensating circuit for a sensor comprising a clutch driven potentiometer, a movable contact on said potentiometer, means for energizing said potentiometer, a resolver, circuit means connecting said movable contact to said resolver, a sensor for supplying said resolver with a signal in accordance with a condition of said sensor, and means responsive to said resolver to actuate said movable contact to provide a compensating signal to said resolver in accordance with said condition of said sensor over a predetermined range, and stop means on said potentiometer to limit said compensating signal to a predetermined value.

2. The combination as set forth in claim 1 in which said sensor is an altimeter.

3. The combination as set forth in claim 1 in which an impedance matching transformer is connected between said movable contact and said resolver.

4. The combination as set forth in claim 1 in which said compensating signal energizes a compensating winding on said resolver.

5. The combination as set forth in claim 1 in which said compensating signal is in one direction for motion of said sensor in one direction and in the opposite direction when the motion of said sensor is in an opposite direction.

References Cited

UNITED STATES PATENTS 3,247,717    4/1966    Kemmer et al. _____ 73—398

DONALD O. WOODIEL, Primary Examiner